Nov. 9, 1937. W. L. MORRISON 2,098,255
AIR DEFLECTING DEVICE
Filed Nov. 20, 1933 2 Sheets-Sheet 1

Inventor
Willard L. Morrison
By Parker & Carter Attys.

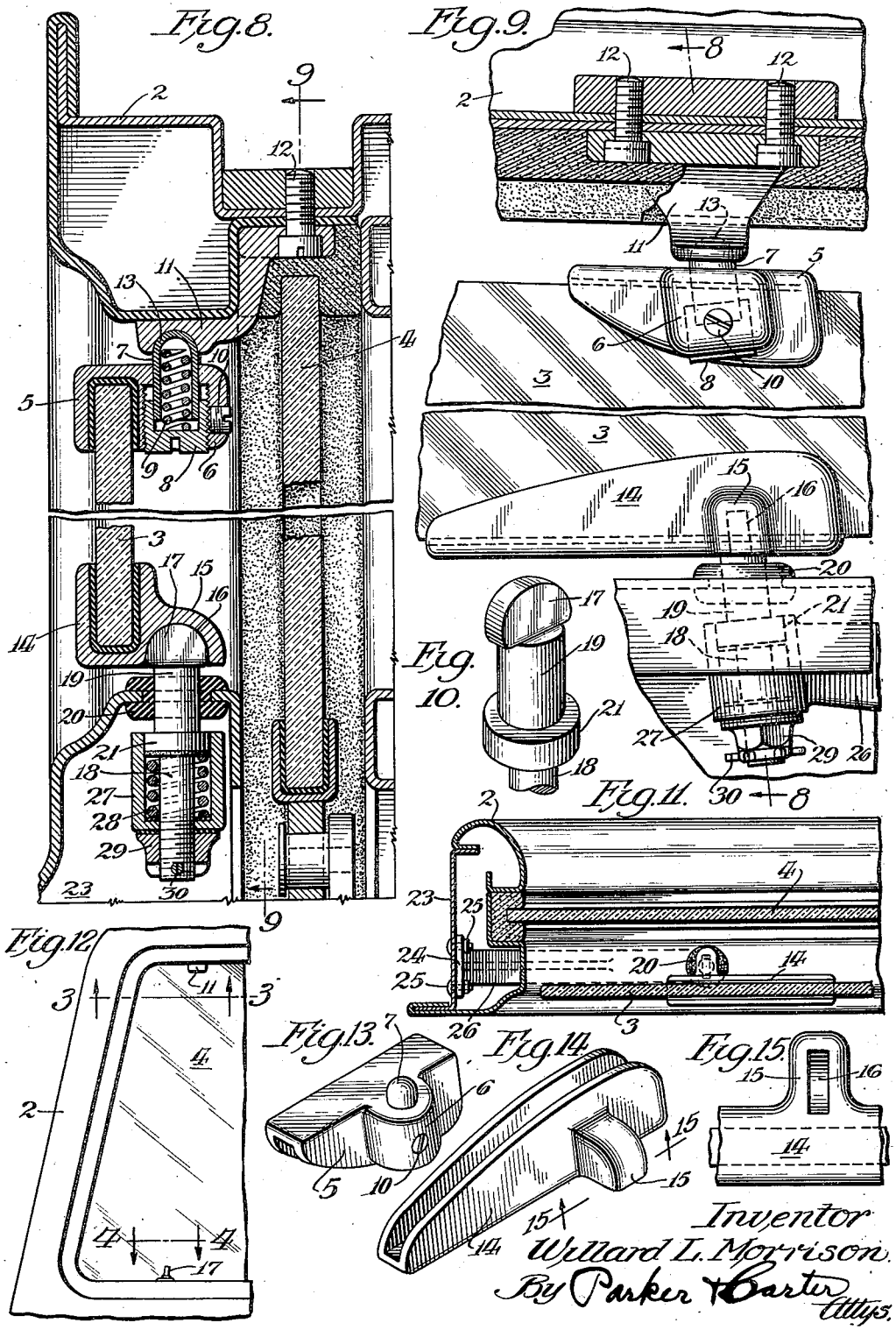
Nov. 9, 1937. W. L. MORRISON 2,098,255
AIR DEFLECTING DEVICE
Filed Nov. 20, 1933 2 Sheets-Sheet 2
Inventor
Willard L. Morrison
By Parker & Carter
Attys Patented Nov. 9, 1937

2,098,255

UNITED STATES PATENT OFFICE 2,098,255

AIR DEFLECTING DEVICE

Willard L. Morrison, Lake Forrest, Ill.

Application November 20, 1933, Serial No. 698,769

8 Claims. (Cl. 296—84)

This invention relates to air deflecting devices and has for its object to provide a new and improved device of this description. The invention has as a further object to provide an air deflecting device having a concealed friction pivot. The invention has as a further object to provide an air deflecting device to be used in connection with the usual sliding window, wherein there is a friction pivot mounted on a bracket fastened to the inside post of the door of the automobile. The invention has further objects which are more particularly pointed out in the accompanying description.

Referring now to the drawings, Fig. 1 is a side view of an automobile with one form of the air deflecting device in position;

Fig. 8 is an enlarged sectional view taken on line 8—8 of Fig. 9, with parts broken away;

Fig. 9 is a sectional view taken on line 9—9 of Fig. 8;

Fig. 10 is a perspective view of the lower pivot, with parts broken away;

Fig. 11 is a sectional view taken on line 11—11 of Fig. 2;

Fig. 12 is a view of the front end of the window opening with the air deflecting device removed;

Fig. 13 is a perspective view of the upper pivot and the part which connects it with the glass;

Fig. 14 is a perspective view of the part which connects the lower pivot with the glass; and Fig. 15 is a view taken on line 15—15 of Fig. 14.

Like numerals refer to like parts throughout the several figures.

Figure 1:
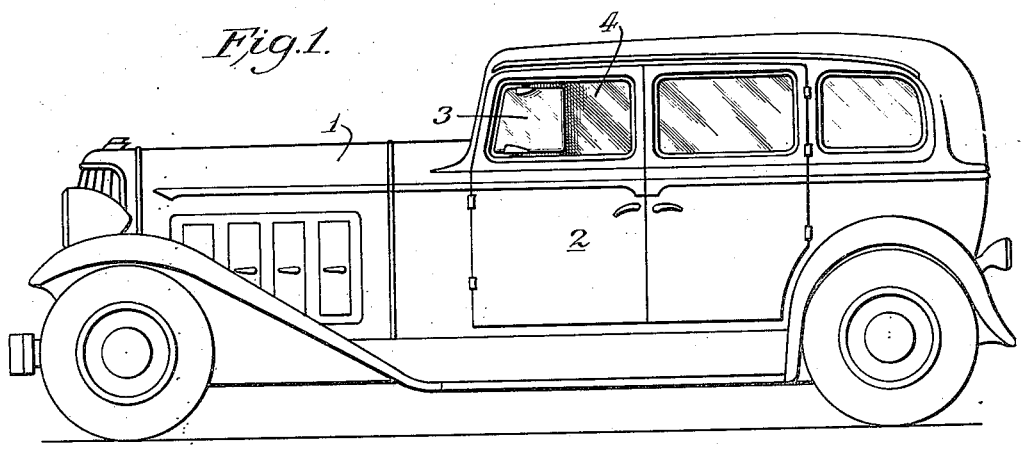

Referring now to the drawings, I have shown an automobile 1 having a front door 2 with the deflector glass 3 mounted in the window opening on the outside of the ordinary glass 4. This air deflector glass 3 is mounted in the window opening by means of two pivots, one at the upper edge thereof and the other at the lower edge. Connected with the upper edge of the glass is a member 5 having a projection 6 at the side thereof which is hollow, and into which is received the upper pivot 7. This pivot may be mounted in any desired manner.

Figures 2, 3, 4, 5, 6, 7:
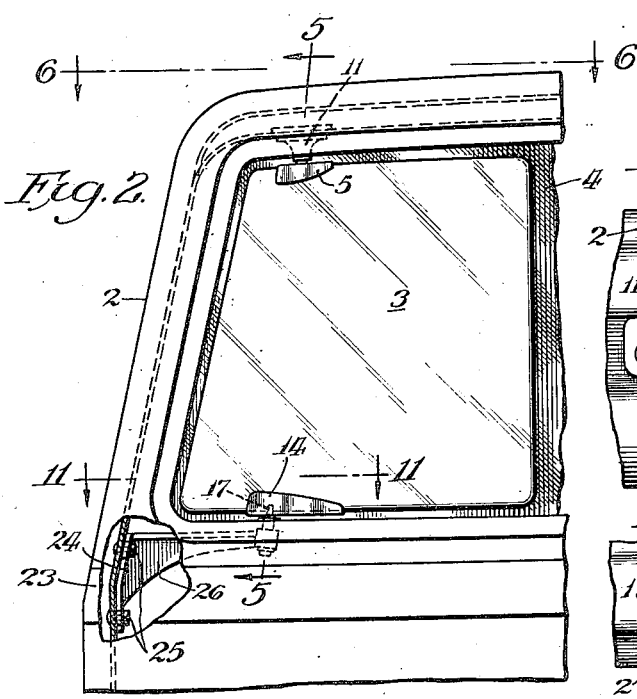
Fig. 2 is an enlarged view, with parts broken away, showing the air deflecting device in position.
Fig. 3 is a view as seen from below, taken on line 3—3 of Fig. 12, of the seat for the upper pivot of the air deflecting device with the deflector glass removed.
Fig. 4 is a view looking down on the top of the lower pivot, taken on line 4—4 of Fig. 12, with the deflector glass removed.
Fig. 5 is a sectional view taken on line 5—5 of Fig. 2.
Fig. 6 is a view taken on line 6—6 of Fig. 2.
Fig. 7 is a perspective view of the bracket by which the friction pivot is supported.

As herein shown the projection 6 is threaded and has a hollow nut 8, see Fig. 8. The pivot 7 is mounted in this nut and extends through an opening in the top of the projection, as shown in Figs. 8 and 13. A spring 9 engages the pivot and the nut 8 and normally presses the pivot towards its seat. The nut can be adjusted to secure the desired adjustment, and may then be held in place by the set screw 10. A bracket 11 is attached by fastening devices 12 to the window frame and is provided with a pivot receiving recess 13, see Fig. 3, into which the end of the pivot 7 is received. Connected with the lower edge of the glass 3 is a member 14 which has a projection 15 on the side thereof, said projection being provided with a recess 16 into which is received the flat head 17 of the lower pivot 18. The head 17 is loosely mounted in the recess 16. The pivot 18 is provided with a section 19 which extends through the reveal, and there is preferably a piece 20 of non-metallic material, such as rubber or rubber compound, into which this section 19 is received, see Fig. 8. The pivot is also provided with an enlargement 21. The pivot 18 is supported upon a bracket attached to the inside of the door post 23, see Fig. 2. This bracket is provided with the fastening piece 24, see Figs. 2 and 7, which is fastened to the door post by the fastening devices 25. The pivot may be fastened to the bracket in any desired manner.

As herein shown the bracket has a laterally extending arm 26 which projects under the reveal and which is provided at its end with a hollowed out portion 27. The pivot 18 passes through this hollowed out portion, as shown in Fig. 8, and the enlargement 21 fits into the upper end thereof. A spring 28 is located in this hollowed out portion and surrounds the pivot 18 and bears against the enlargement 21 and the bottom of the hollowed out portion. The lower end of the pivot 18 is threaded and has on the end a nut 29 which may be tightened to compress the spring. When the spring has been properly compressed, the nut may be held against rotation by means of the pin 30. In placing the device in position, the bracket is attached to the door post and the lower pivot mounted thereon. The glass section 3, which has the members 5 and 14 thereon, is then placed in position with the recess 16 over the head 17 of the pivot 18. The upper pivot 13 is then placed in position and the nut 18 adjusted and fastened, the parts then being in position as shown in Fig. 8. The flat head 17 has a rounded upper face, as shown, and the recess 16 is similarly shaped so that the device will readily adjust itself to any misalignments or to other inequalities of the parts.

I claim:

1. An air deflecting device for automobiles having a window opening, comprising a deflector element, a pivot for pivotally connecting the top thereof in position in the window opening, a bracket attached to a vertically extending member at the front of the window opening and projecting under the reveal, and a vertically extending pivot loosely connected with the lower edge of said deflector element and supported by said bracket and means for preventing relative rotation of the pivot and the deflector element.

2. An air deflecting device for automobiles having a window opening, comprising a deflector element, a pivot for pivotally connecting the top thereof in position in the window opening, a bracket attached to a vertically extending member at the front of the window opening and projecting under the reveal, a pivot connected with the lower edge of said deflector element and supported by said bracket, said bracket having a hollow member through which the pivot projects, a spring in said hollow member and surrounding the pivot, and adjustable means for compressing the spring against some part of the pivot and said hollow member said adjustable means being concealed under the window reveal.

3. An air deflecting device for automobiles having a window opening, comprising a deflector element, a vertically extending pivot loosely connected at its lower end with the bottom of said deflector element and projecting through the reveal said pivot having its upper end engaging the lower end of the deflector, and a bracket under the reveal and fastened to a part of the automobile and having a part which extends under said pivot, the pivot being supported thereon.

4. An air deflecting device for automobiles having a window opening, comprising a deflector element, there being a pivot receiving recess in the bottom of said deflector element, a rotatable pivot having its upper end in said pivot receiving recess, said pivot rotatable about its longitudinal axis, and projecting through the reveal, a bracket under the reveal and fastened to a part of the automobile and having a part which extends under said pivot, the pivot being supported thereon.

5. An air deflecting device for automobiles having a window opening, comprising a deflector element, a pivot connected with the bottom of said deflector element and projecting through the reveal, a bracket under the reveal and fastened to a part of the automobile and having a part which extends under said pivot, the pivot being supported thereon said upper pivot removably connected with the deflector so that it may be placed in position after the deflector section is mounted on the lower pivot.

6. An air deflecting device for automobiles having a window opening, comprising a deflector element, a bracket fastened to a part of the automobile and projecting under the reveal, a vertically extending pivot connected with and supported upon said bracket and having its upper end projecting through the lower reveal, a member connected with the lower part of said deflector element and extending along its lower edge provided with a recess, the upper end of the pivot projecting into said recess and engaging the face thereof, the upper end of the pivot and the face of said recess acting as the supporting faces for supporting the deflector element on the pivot.

7. An air deflecting device for automobiles having a window opening, comprising a deflector element, a bracket fastened to a part of the automobile and projecting under the reveal, a vertically extending pivot connected with and supported upon said bracket and having its upper end projecting through the reveal, a member connected with the lower part of said deflector element and extending along its lower edge provided with a shallow recess into which the upper end of said pivot is received, the top of the pivot and the recess having curved meeting faces.

8. An air deflecting device for automobiles having a window opening, comprising a deflector element, a bracket fastened to a part of the automobile and projecting under the reveal, a vertically extending pivot connected with and supported upon said bracket and having its upper end projecting through the reveal, a member connected with the lower part of said deflector element and extending along its lower edge provided with a shallow recess into which the top of said pivot is received, a pivot connected with the upper part of said deflector section and adjustable to and from the reveal.

WILLARD L. MORRISON.